(12) United States Patent
Shelef

(10) Patent No.: US 7,173,779 B2
(45) Date of Patent: Feb. 6, 2007

(54) KINEMATIC MOUNT HAVING CONNECTORS WITH BEVELED EDGES

(75) Inventor: Gad Shelef, Palo Alto, CA (US)

(73) Assignee: Gizmonies, Inc., Mountain View, CA (US)

( * ) Notice: Subject to any disclaimer, the term of this patent is extended or adjusted under 35 U.S.C. 154(b) by 25 days.

(21) Appl. No.: 11/110,114

(22) Filed: Apr. 19, 2005

(65) Prior Publication Data

US 2006/0245088 A1 Nov. 2, 2006

(51) Int. Cl.
*G02B 7/02* (2006.01)
*F16M 11/02* (2006.01)

(52) U.S. Cl. ................................. 359/819; 248/181.1

(58) Field of Classification Search ........ 359/819–823, 359/827–830, 694, 808–811; 248/181.1, 248/181.2, 178.1, 179.1, 180.1; 403/121, 403/122; 356/124
See application file for complete search history.

(56) References Cited

U.S. PATENT DOCUMENTS

| | | | |
|---|---|---|---|
| 1,626,760 A | 5/1927 | Schneider | 248/645 |
| 4,070,120 A | 1/1978 | Bald et al. | 403/13 |
| 4,290,574 A | 9/1981 | Archibald | 248/177 |
| 4,409,738 A | 10/1983 | Renander et al. | 33/281 |
| 4,534,047 A | 8/1985 | Deschenaux et al. | 378/35 |
| 4,610,020 A | 9/1986 | La Fiandra | 378/35 |
| 4,770,497 A | 9/1988 | Brown | 359/896 |
| 4,929,073 A | 5/1990 | La Plante et al. | 359/848 |
| 5,544,213 A | 8/1996 | Chiba et al. | 378/34 |
| 5,678,944 A | 10/1997 | Slocum et al. | 403/13 |
| 5,733,024 A | 3/1998 | Slocum et al. | 312/223.2 |
| 5,748,827 A | 5/1998 | Holl et al. | 385/134 |
| 5,847,885 A * | 12/1998 | Arnone et al. | 359/818 |
| 6,056,405 A | 5/2000 | Heintz et al. | 353/85 |

(Continued)

FOREIGN PATENT DOCUMENTS

JP 62038875 2/1987

(Continued)

OTHER PUBLICATIONS

Gad Shelef, "Spherolinder (connector)", Internet Article, Mar. 28, 2005, URL:http://web.archive.org/web/200510328180, 1 page.

*Primary Examiner*—Ricky Mack
*Assistant Examiner*—Mohammed Hasan
(74) *Attorney, Agent, or Firm*—Morgan, Lewis & Bockius LLP

(57) ABSTRACT

The kinematic mount includes first and second plates and three connectors. The first plate has three grooves therein. The grooves are spaced 120 degrees apart from one another. The second plate has three indentations therein. Each of the indentations is located at a respective apex of an equilateral triangle. Each of the three connectors include first and second surfaces. The first surface is configured to contact a respective groove along two substantially parallel contact lines each having opposing ends. The first surface is formed such that each of the two contact lines is curved near its opposing ends. The second surface is coupled to the first surface. The second surface is configured to contact a respective indentation along an annular contact line. The curved ends of the contact lines prevent the connector from binding to the first plate when the kinematic mount is highly loaded.

17 Claims, 17 Drawing Sheets

U.S. PATENT DOCUMENTS

| | | | |
|---|---|---|---|
| 6,072,569 A | 6/2000 | Bowen | 356/124 |
| 6,170,795 B1 | 1/2001 | Wayne | 248/664 |
| 6,193,430 B1 | 2/2001 | Culpepper et al. | 403/13 |
| 6,325,351 B1 | 12/2001 | Hale et al. | 248/562 |
| 6,729,589 B2 | 5/2004 | Shelef | 248/181.1 |
| 2003/0086748 A1 | 5/2003 | Culpepper | 403/13 |
| 2004/0065793 A1 | 4/2004 | Shelef | 248/181.1 |
| 2004/0100705 A1* | 5/2004 | Hubbs | 359/819 |

FOREIGN PATENT DOCUMENTS

JP  03125049  5/1991

* cited by examiner

Section B-B'

KINEMATIC MOUNT HAVING CONNECTORS WITH BEVELED EDGES

TECHNICAL FIELD

The present invention relates generally to kinematic mounts that are used for removably coupling two plates to one another, such that despite repeated disassembly and reassembly the plates remain in identical positions when reassembled.

BACKGROUND

Kinematic mounts, otherwise known as kinematic couplings or restraints, are commonly used to couple measuring equipment or instruments to a base or substructure, where despite repeated disassembly and reassembly the plates remain in the same relative position to one another as when initially assembled. Examples of such instruments include: precision instruments, such as optical elements, including lenses mirrors, prisms, telescopes, cameras, lasers, sensors, or the like; sensitive measuring equipment; strain sensitive devices; lithography equipment, such as projection optics; and instruments that are disassembled and moved frequently so that a permanent support is not suitable.

Very small changes in the position of such instruments can make a substantial difference in the accuracy of results obtained from the instrument. Kinematic mounts were developed to address these small changes in the position during repeated assembly.

According to well-known principles, for a rigid body to be completely fixed in space, all six degrees of freedom need to be constrained. In other words, three translations and three rotations must be constrained with respect to some arbitrary fixed coordinate system. A mount is said to be kinematic when all six degrees of freedom are constrained without any additional constraints, i.e., any additional constraints would be redundant. A kinematic mount therefore has six independent constraints.

One well-known kinematic mount includes first and second plates. The first plate is generally fixed in space, while the second plate is free to move. The first plate has three V-shaped grooves formed therein, where each groove forms an angle of approximately 120 degrees with each other groove, and the walls of each groove form angles of approximately 45 degrees with the surface of the base plate. The second plate forms three depressions at the apexes of an equilateral triangle. The depressions are aligned with the grooves. During assembly, a spherical member is placed into each groove, contacting the two side walls of each respective groove at two point contacts. The second plate is then positioned onto the spherical members, such that each spherical member rests in a respective depression. In use, an instrument is be secured to the second plate. When the second plate is lifted from the first plate and replaced it will occupy the identical position relative to the first plate, which normally remains fixed.

However, the above described point contacts between each spherical member and groove leads to concentrated forces at these point contacts. These concentrated forces lead to high stresses, known as Hertzian stresses, both at the spherical member and at the groove.

Accordingly, the above described mount, while being sufficient for light loads, such as laboratory applications or light-duty field applications, fails in heavy-duty applications, such as when used in space launch vehicles, where high loads and high intensity vibrations and shocks cause failure at the point contacts.

Furthermore, when the kinematic mount is under a sufficiently heavy load, a depression or dent may be formed in the side walls of the groove that supports the spherical member. If the depression or dent is sufficiently deep, it may restrict the longitudinal movement of the spherical member in the groove. As a result, the second plate bearing the heavy load may not be accurately positioned, as accurate realignment typically requires some movement of the spherical members along the grooves.

In light of the above it is highly desirable to provide a kinematic mount that addresses the high stresses generated at the point contacts by heavy loads, while ensuring accurate realignment.

SUMMARY OF THE INVENTION

According to the invention there is provided a kinematic mount for repeatedly coupling two components together. The kinematic mount preferably includes a first plate, a second plate, and three connectors. The second plate has three indentations therein, where the indentations are each located at respective apexes of an equilateral triangle and are preferably conical indentations. The first plate has three grooves therein, where the grooves are spaced about 120 degrees apart from one another. Each connector comprises a first surface and a second surface. The first surface forms an annular contact line between the first surface and one of the indentations. The second surface is coupled to the first surface and defines two substantially parallel contact lines between the second surface and one of the grooves. In a preferred embodiment, the first surface defines a spherical surface and the second surface defines a cylindrical surface. A center of a sphere that defines said spherical surface substantially coincides with a centerline of a cylinder that defines said cylindrical surface.

In some embodiments, the kinematic mount includes first and second plates and three connectors. The first plate has three grooves therein. The grooves are spaced 120 degrees apart from one another. The second plate has three indentations therein. Each of the indentations is located at a respective apex of an equilateral triangle. Each of the three connectors include first and second surfaces. The first surface is configured to contact a respective groove along two substantially parallel contact lines each having opposing ends. The first surface is formed such that each of the two contact lines is curved near its opposing ends. The second surface is coupled to the first surface. The second surface is configured to contact a respective indentation along an annular contact line. The curved ends of the contact lines prevent the connector from binding to the first plate when the kinematic mount is highly loaded. This kinematic mount provides increased stiffness and repeatability under high loads.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings. For ease of reference, the first number of any reference numeral generally indicates the Figure number in which the reference numeral can be found.

DETAILED DESCRIPTION OF EMBODIMENTS

The kinematic mount is used to removably couple two components, such as plates, together in an identical relative position as when previously coupled. The kinematic mount applies exactly six constraints against the three translational and three rotational degrees of freedom and thus reduces stress between the connector and the first plate. This increases the load capacity and the mechanical stiffness of the kinematic mount, while reducing wear and failure.

Figure 1A:
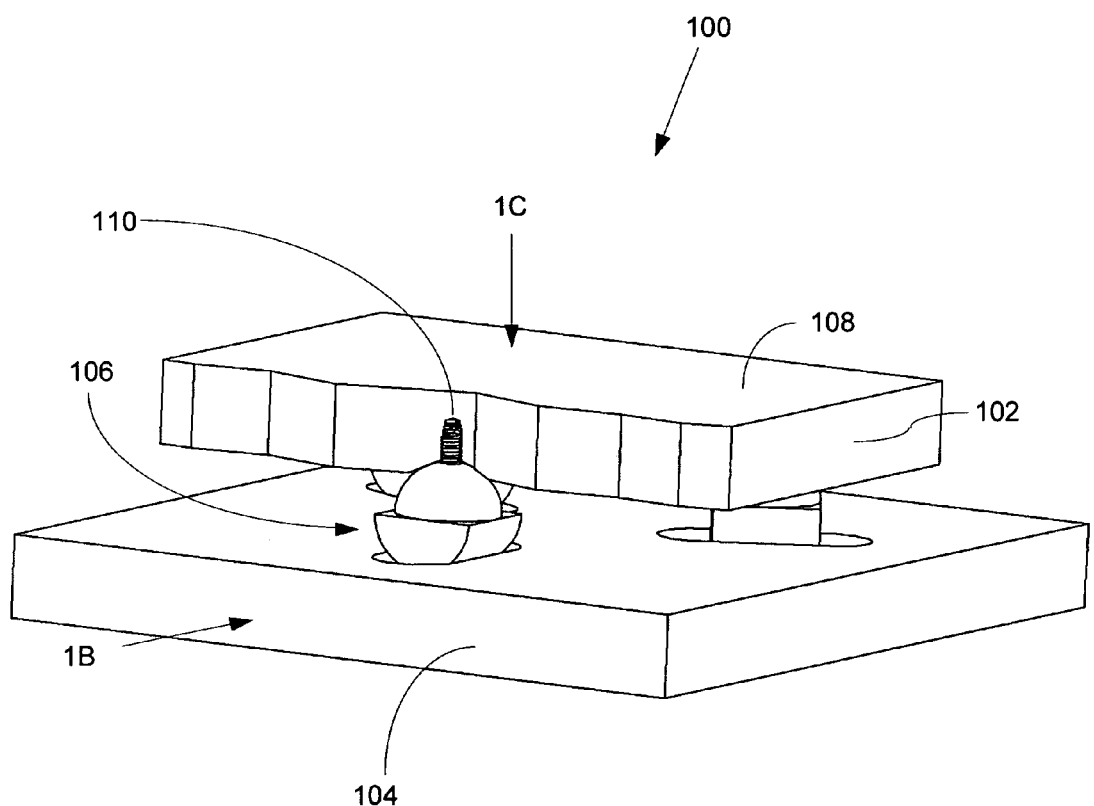
FIG. 1A is a cross sectional isometric view of a kinematic mount, according to an embodiment of the invention.
Figure 1B:
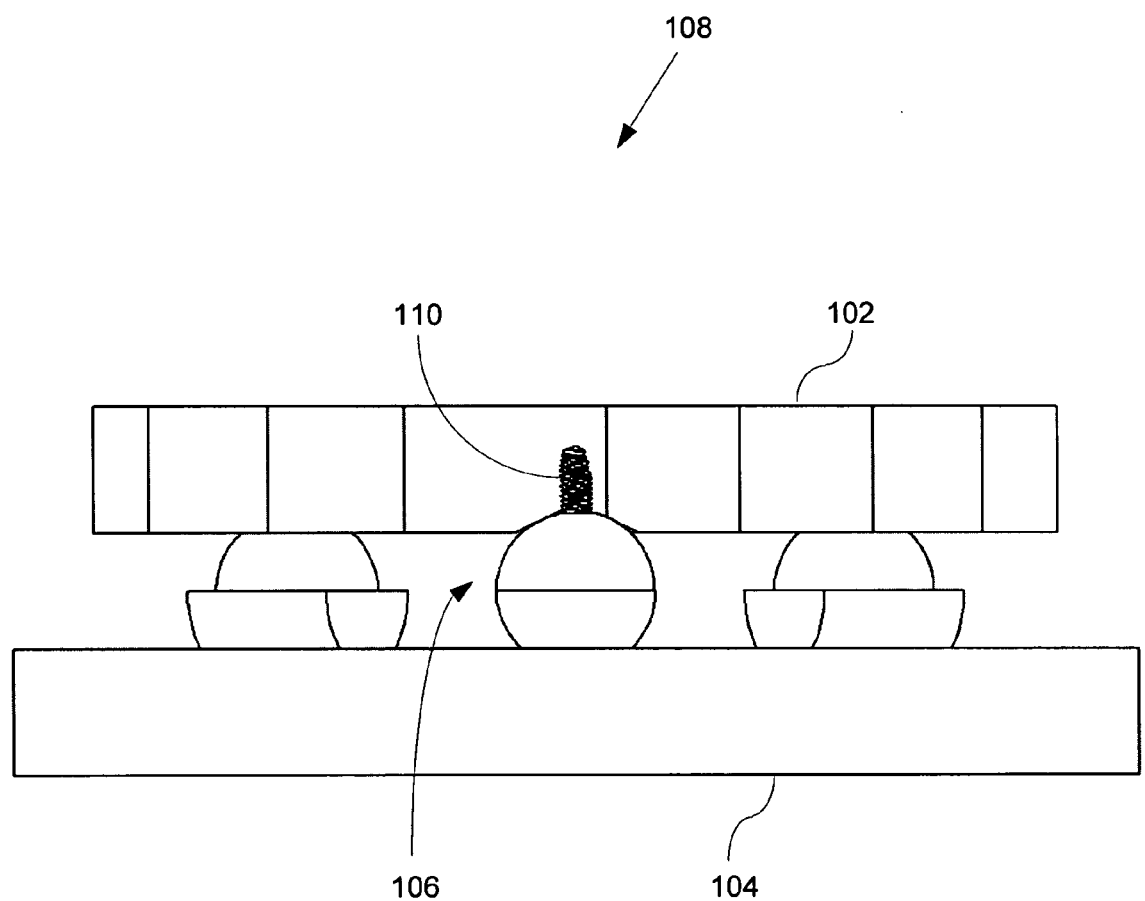
FIG. 1B is a side view of the kinematic mount shown in FIG. 1, as viewed along line 1B of FIG. 1A.
Figure 1C:
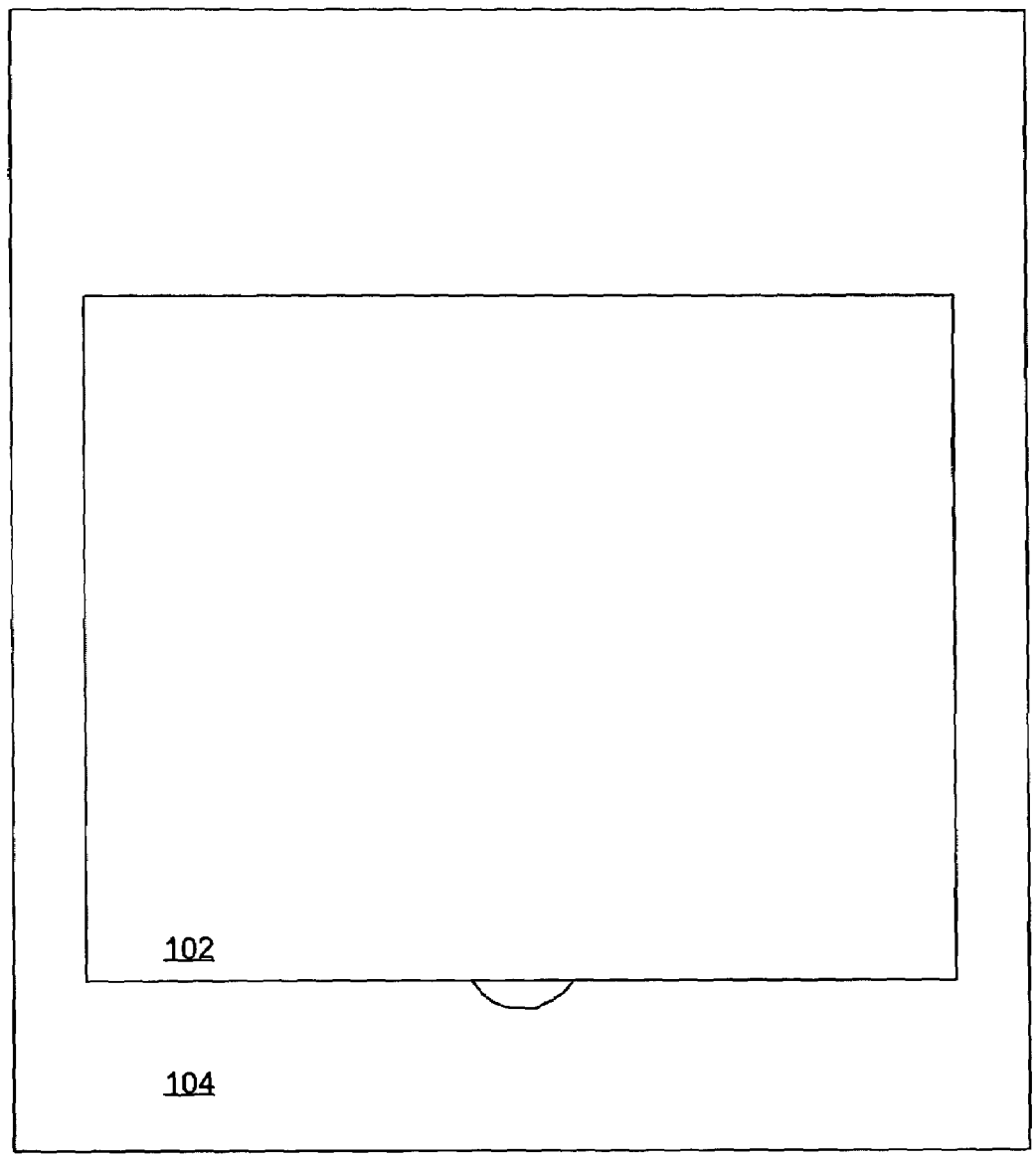
FIG. 1C is a top view of the kinematic mount shown in FIGS. 1A and 1B, as viewed along line 1C of FIG. 1A.

FIG. 1A is a partial isometric view of a kinematic mount 100; FIG. 1B is a side view of the kinematic mount 100, as viewed along line 1B in FIG. 1A; and FIG. 1C is a top view of the kinematic mount shown in FIG. 1A, as viewed along line 1C of FIG. 1A. When assembled, the kinematic mount includes the following components: a second plate 102, a first plate 104, and three connectors 106 used to couple the second plate, connector, and first plate to one another. For ease of explanation, the first plate 104 and the second plate 102 are partially cut-away to expose the connector 106. In a preferred embodiment the plates 102 and 104 are substantially flat, however, it should be appreciated that the plates may take on any suitable form.

In a preferred embodiment, an instrument is attached to a first side 108 of the second plate 102 remote from the connector 106. Similarly, in a preferred embodiment, the first plate 104 is attached to a rigid support, such as a tripod. Alternatively, the instrument may be attached to the first plate, and the second plate attached to a rigid support. One screw 110 is used to retain the clamp to the first plate 104, as explained in further detail below.

Figure 2A:
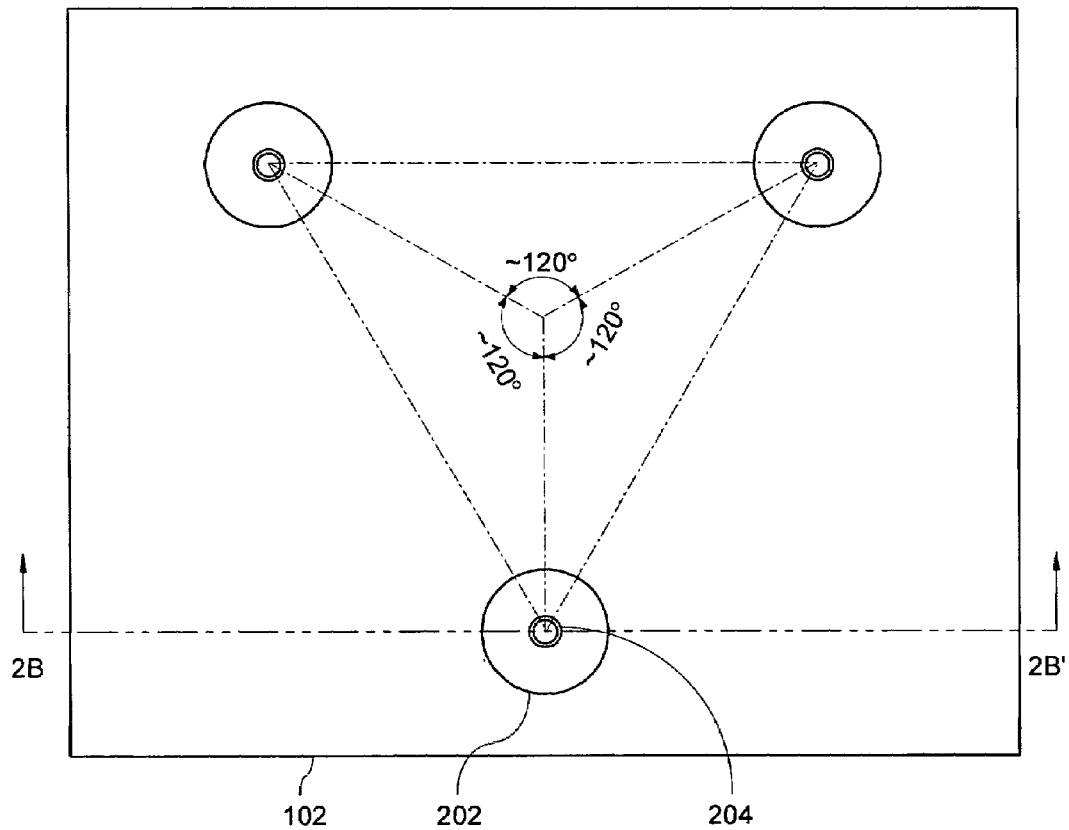
FIG. 2A is a bottom view of a second plate shown in FIG. 1A.
Figure 2B:
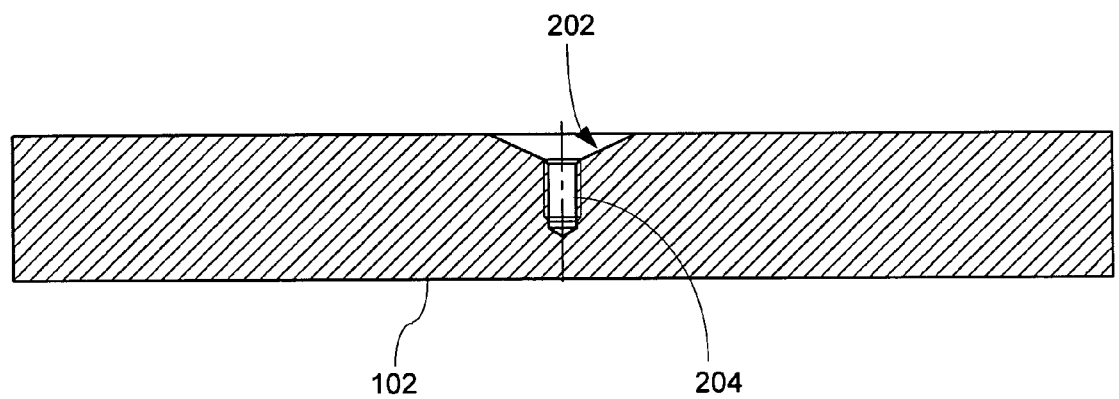
FIG. 2B is a cross-sectional view of the second plate shown in FIG. 1A, as viewed along line 2B–2B' of FIG. 2A.

FIG. 2A is a bottom view of a second plate shown in FIG. 1A, while FIG. 2B is a cross-sectional view of the second plate shown in FIG. 1A, as viewed along line 2B–2B' of FIG. 2A. The second plate 102 includes three indentations 202 disposed at the apexes of an equilateral triangle, i.e., disposed approximately 120 degrees apart from one another. The indentations 202 are preferably frustro-conical (conical frustum) indentations. However, in an alternative embodiment, the indentations may be any suitable shape, such as: hemispherical, frusto-hemispherical, frusto-pyramidal, pyramidal, conical, arcuate, or the like.

In a preferred embodiment, the indentation 202 includes a hole 204 at the center of the indentation 202 extending into the second plate away from the side of the second plate that has the indentation. The hole 204 is sized such that the head of the screw 110 does not interfere with the walls of the hole.

Figure 3A:
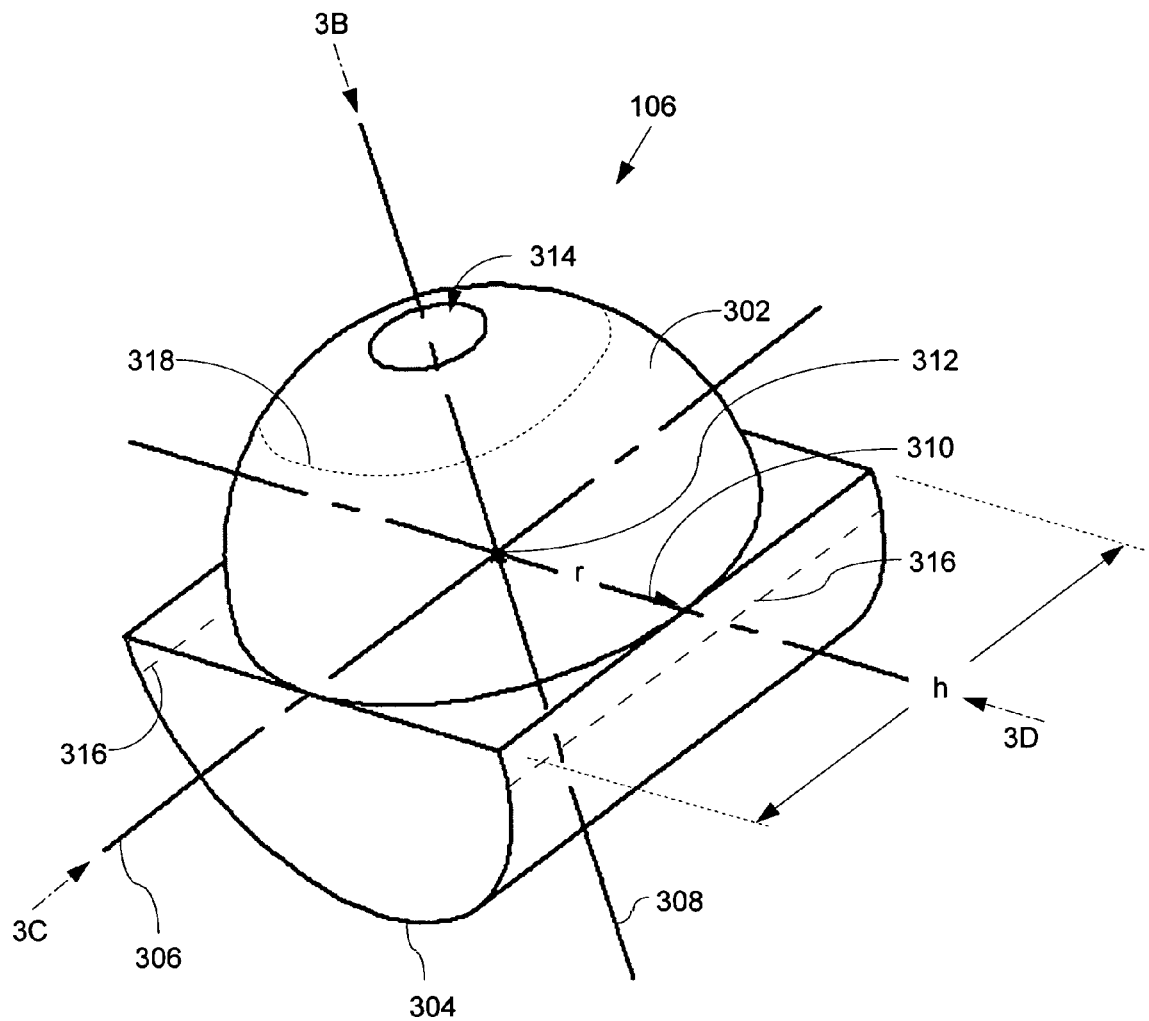
FIG. 3A is a partial isometric view of a connector shown in FIG. 1A.
Figure 3B:
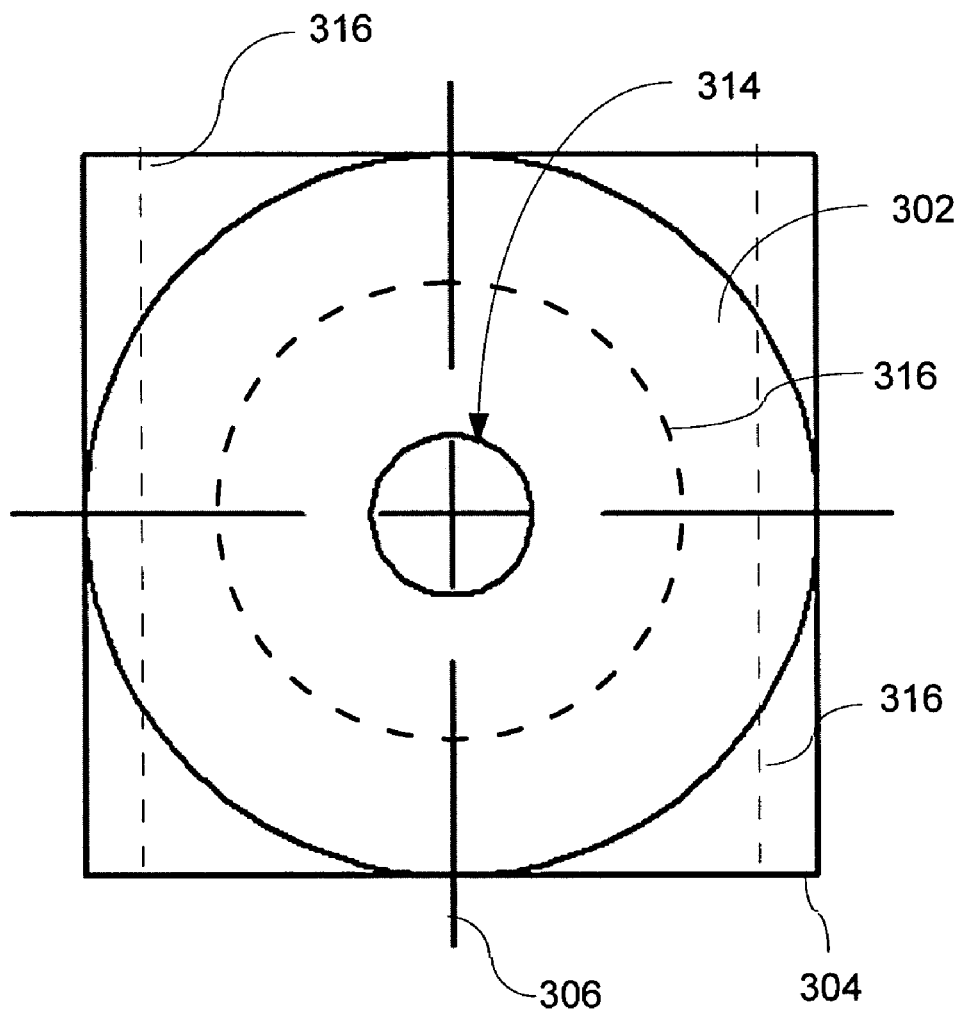
FIG. 3B is a top view of a connector shown in FIG. 3A, as taken along line 3B of FIG. 3A.
Figure 3C:
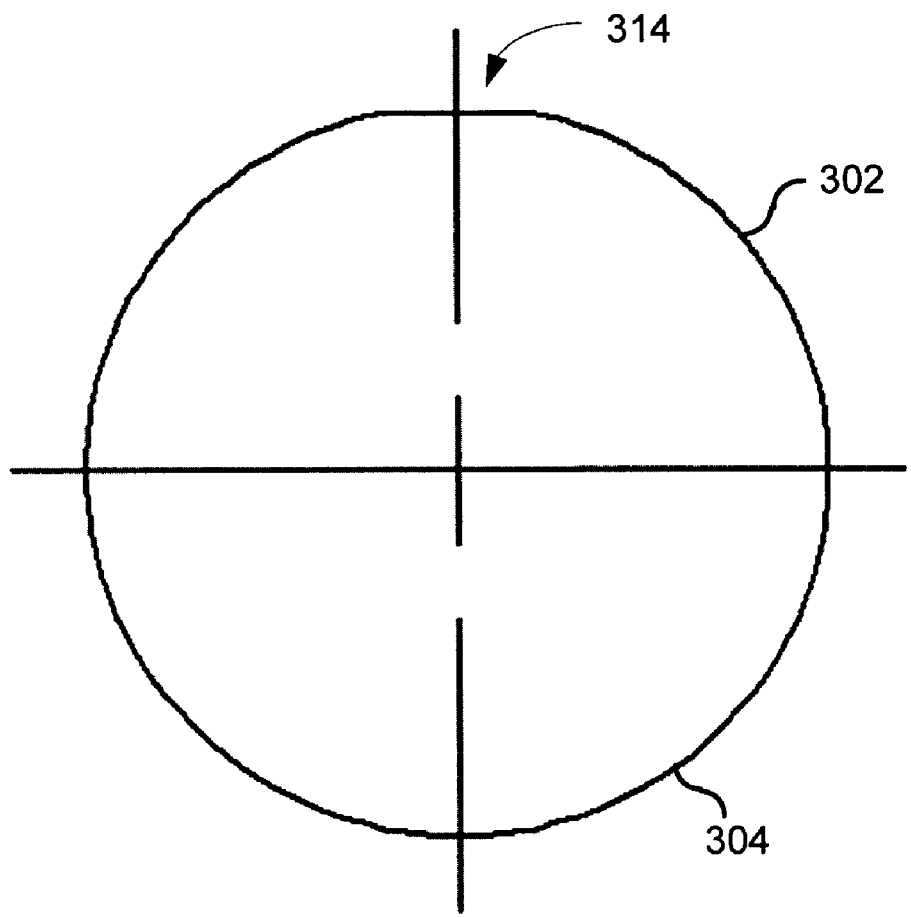
FIG. 3C is a first side view of a connector shown in FIG. 3A, as taken along line 3C of FIG. 3A.
Figure 3D:
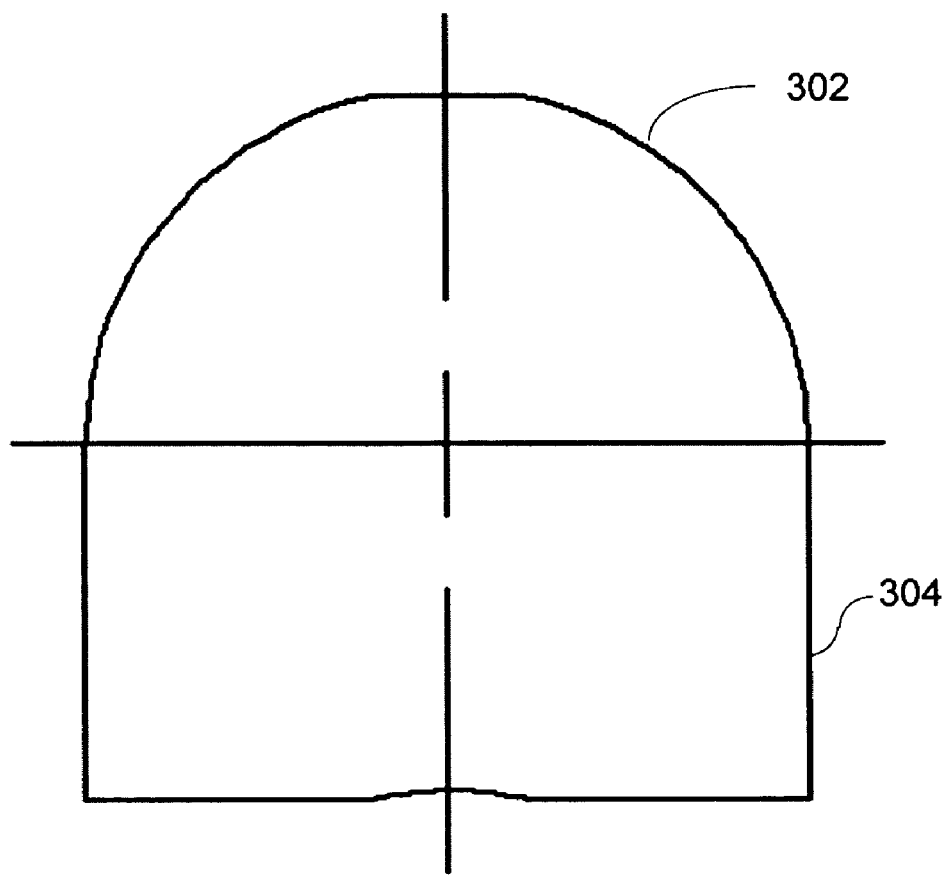
FIG. 3D is a second side view of a connector shown in FIG. 3A, as taken along line 3D of FIG. 3A.
Figure 4A:
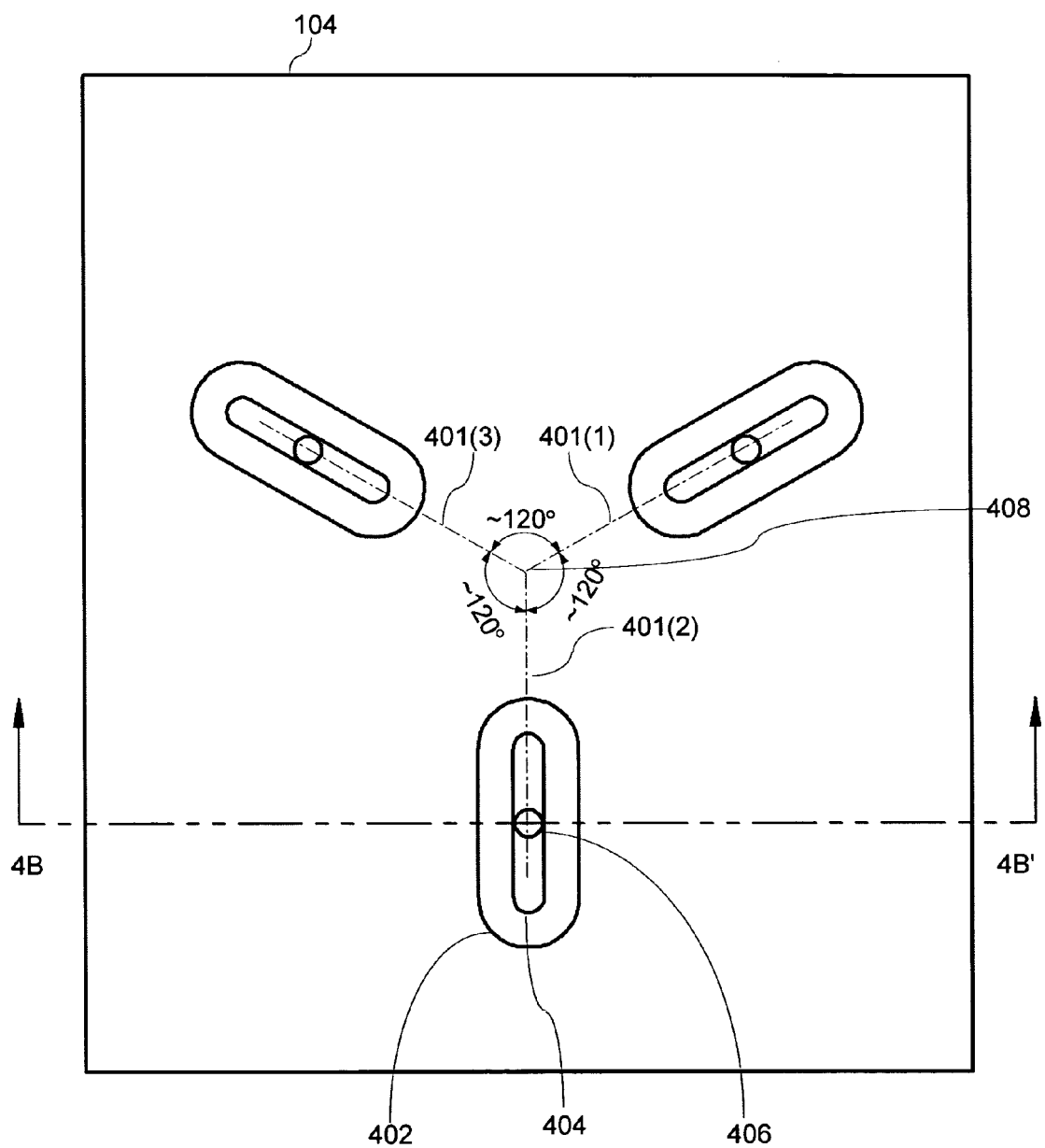
FIG. 4A is a top view of a first plate shown in FIG. 1A.

FIG. 3A is a partial isometric view of a connector 106 shown in FIG. 1A; FIG. 3B is a top view of the connector 106 shown in FIG. 3A, as taken along line 3B of FIG. 3A; FIG. 3C is a first side view of a connector shown in FIG. 3A, as taken along line 3C of FIG. 3A; and FIG. 3D is a second side view of a connector shown in FIG. 3A, as taken along line 3D of FIG. 3A. Connector 106 comprises a first surface 302 and a second surface 304. The first surface 302 defines an annular contact line 318 between the connector 106 and second plate 102 (FIG. 1A)—within the indentation 202 (FIGS. 2A and 2B) of the second plate 102. Similarly, the second surface 304 defines two contact lines 316 between the connector 106 and the first plate 104 (FIG. 1A)—within a groove 402 (FIG. 4A). The contact lines 316 are substantially parallel to one another.

In a preferred embodiment, the first surface 302 defines a hemisphere and the second surface 304 defines a half-cylinder or hemicylinder. The hemisphere is half of a sphere cut by a plane passing through the sphere's center 312. Similarly, the half-cylinder is half a cylinder cut by the same plane passing through the cylinders longitudinal axis 306. Therefore, the centers of the hemisphere and cylinder preferably coincide so that the plates will not move relative to each other on consecutive reassemblies.

Also in a preferred embodiment, the radius "r" 310 of the hemisphere about the center 312 is substantially the same as the radius "r" of half-cylinder about the longitudinal axis 306.

Still further, in a preferred embodiment, the connector 106 forms a hole 314 there through that intersects: an apex of the first surface 302, the center 312, and an apex of the second surface 304. The hole has a diameter larger than the diameter of the screw 110 (FIG. 1A) passing through it, letting the connector and second plate adjust themselves without being over constrained by the screw location. This allows any clamping force between the second plate, connector, and first plate to be evenly distributed about the annular contact line 318 and the two substantially parallel contact lines 316.

The location of each plate is tied to the location of the connector through the center of the spherical surface and the centerline of the cylindrical surface. Because the connector is free to rotate a little about the centerline of the cylindrical surface, if the center of the spherical surface and the centerline of the cylindrical surface do not coincide, the plates will move relative to each other on consecutive reassembly. Accordingly, the centers of the spherical surface and the centerline of the cylindrical surface preferably coincide.

Figure 4B:
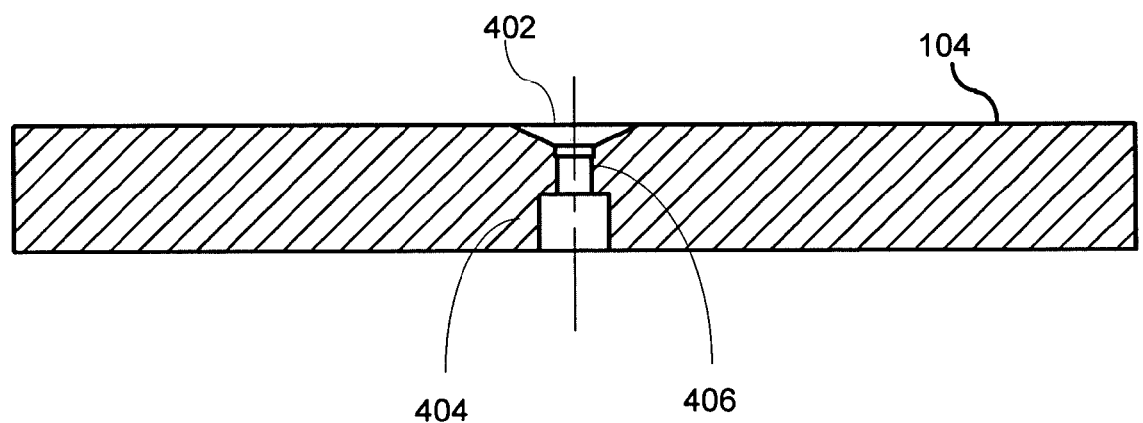
FIG. 4B is a cross-sectional view of the first plate shown in FIG. 4A, as viewed along line 4B–4B' of FIG. 4A.

FIG. 4A is a top view of a first plate 104 shown in FIG. 1A, while FIG. 4B is a cross-sectional view of the first plate 104 shown in FIG. 4A, as viewed along line 4B–4B' of FIG. 4A. The first plate 104 includes three grooves 402 extending along longitudinal axes 401(1)–(3) toward a central point 408. The longitudinal axes of the grooves are disposed 120 degrees apart from one another. Each groove 402 preferably forms a frusto-triangular prism indentation in the first plate, i.e., an indentation having a frusto-triangular cross-section. However, in an alternative embodiment, the grooves may have any suitable shape or cross section, such as: a triangular cross-section; a V-shaped cross-section; a half-cylinder indentation; an arcuate cross-section; or the like.

In a preferred embodiment, the first plate 104 defines a flat portion 404 at the apex (or low-point depending on orientation) of the groove 402. The flat portion 404 includes a threaded hole 406 at its center extending through the first plate. The hole 406 preferably has a diameter slightly larger than the screw 110 (FIG. 1A).

Therefore, to assemble the kinematic mount, a connector 106 (FIG. 1A) is placed in each groove 402 (FIG. 4A) of the first plate 104 (FIG. 1A) so that the second surface 304 (FIG. 3A) of each connector forms two substantially parallel contact lines 316 (FIGS. 3A and 3B) with each corresponding groove. The indentations 202 (FIG. 2A) formed in the second plate 102 (FIG. 1A) are then positioned over the corresponding first surface 302 of each connector 106 (FIG. 1A) so that the first surface 302 (FIG. 3A) of each connector forms an annular contact line 318 (FIGS. 3A and 3B) with each corresponding indentation. The two plates are now aligned.

In a preferred embodiment, a screw 110 (FIG. 1A) is passed through the hole 406 (FIG. 4A) in the first plate 104 (FIG. 1A), through the hole 314 (FIG. 3B) in the connector 106 (FIG. 1A), and into the threaded hole 204 (FIG. 2B) in the second plate 102 (FIG. 1A). The screw is then tightened to clamp the first and second plates together.

Figure 5A:
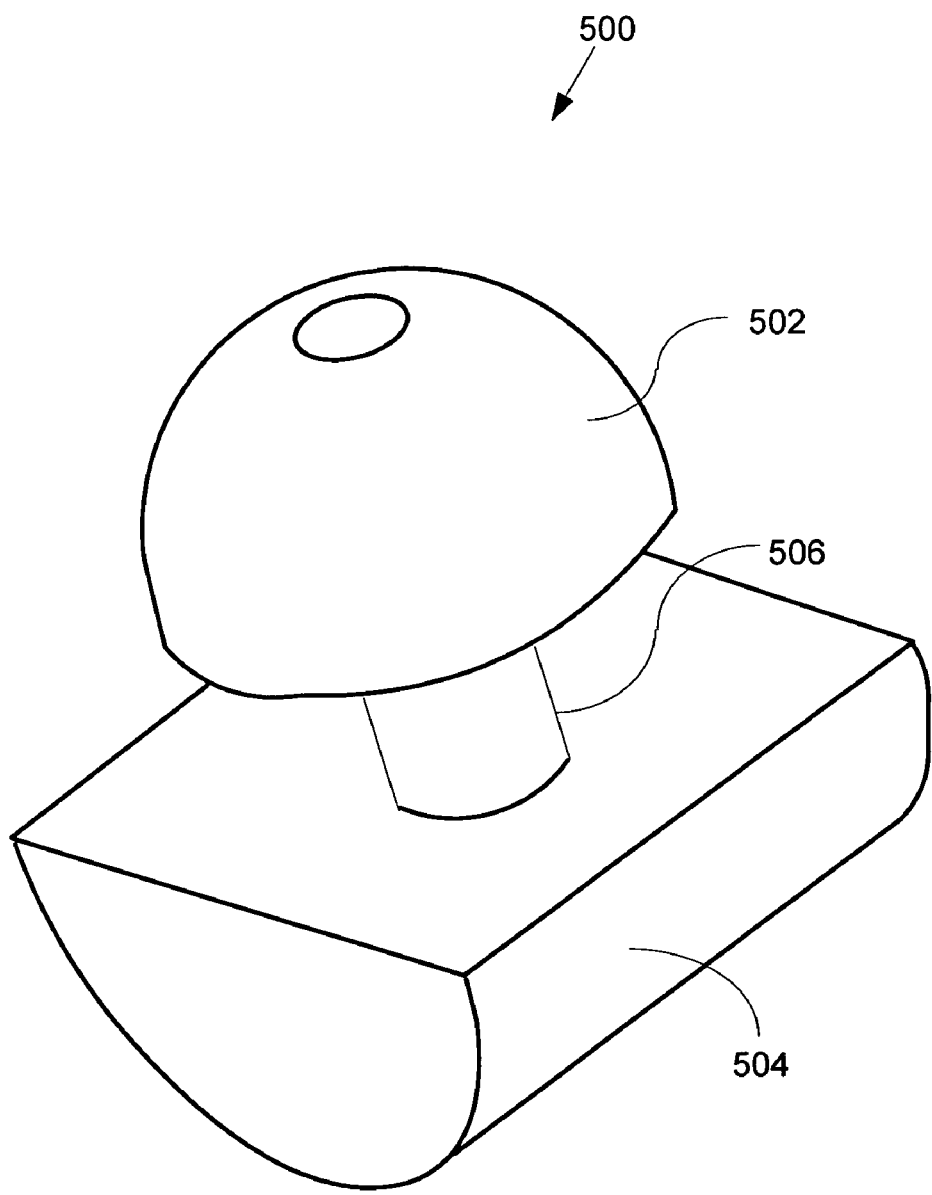
FIG. 5A is another connector, according to another embodiment of the invention.

FIG. 5A is another connector 500, according to another embodiment of the invention. This connector 500 has a partial spherical first surface 502 coupled to a half-cylinder second surface 504 by means of a post. The first surface 502 still defines an annular contact line and the second surface 504 still defines two contact lines, as described above.

Figure 5B:
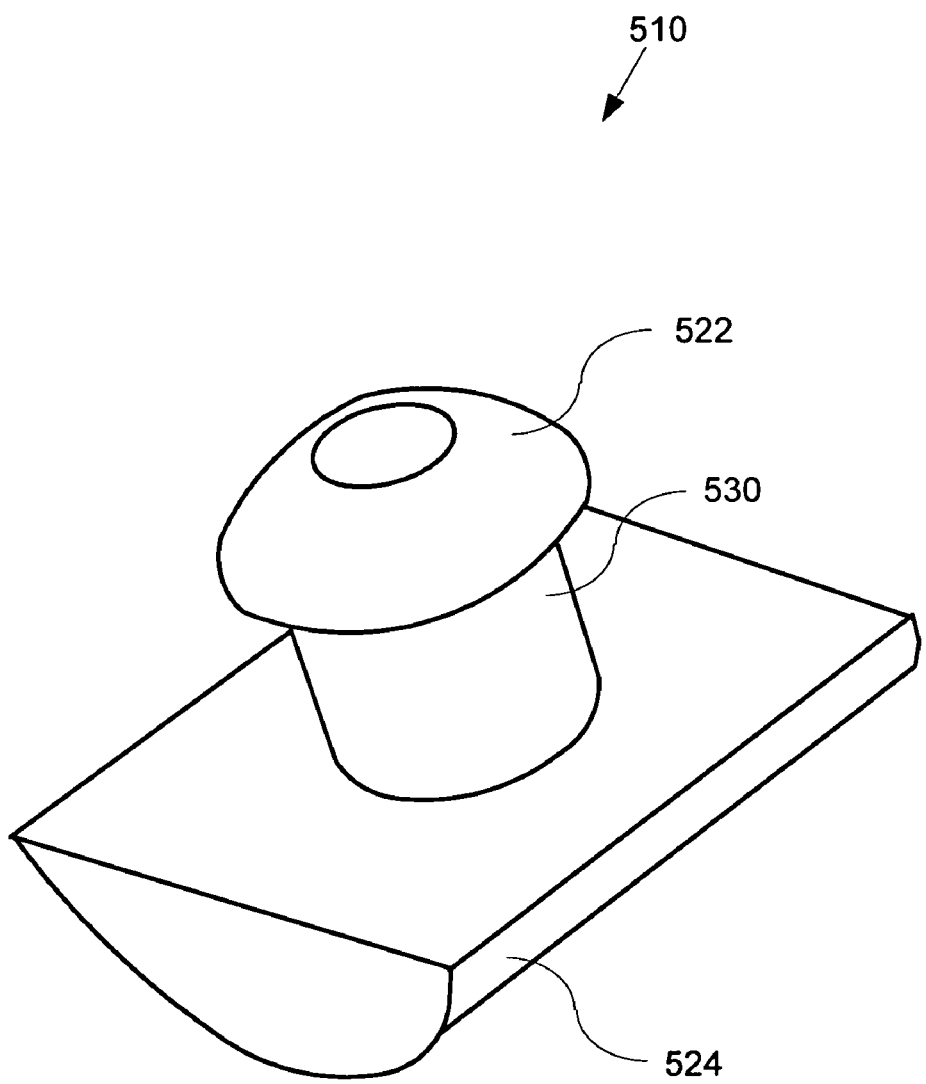
FIG. 5B is still another connector, according to still another embodiment of the invention.

FIG. 5B is still another connector 510, according to still another embodiment of the invention. Here, a partial spherical first surface 522 is coupled to a partial cylindrical second surface 524 via a post 530.

Figure 5C:
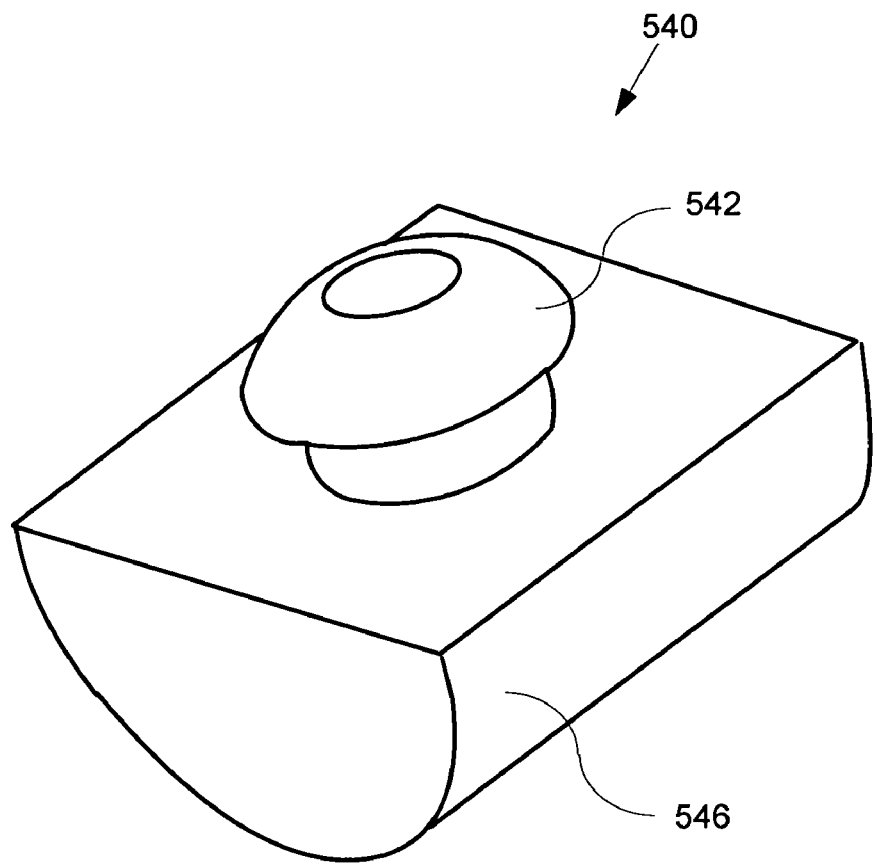
FIG. 5C is even another connector, according to even another embodiment of the invention.

FIG. 5C is even another connector 540, according to even another embodiment of the invention. Here a partial spherical first surface 542 is coupled to a cylindrical second surface 546, also via a post.

The above described substantially parallel contact lines form line contacts with the sides of the grooves 402 (FIG. 4A). This is quite unlike the prior art, which forms a point contact at the grooves. It is this line contact that distributes the applied load, and reduces the build-up of point stresses that form at point contacts. Therefore, the above described embodiments increases stability, stiffness and, therefore, repeatability under higher loads of the kinematic mount, while reducing stress and wear.

However, during the process of application of high load to the second plate the connectors may elastically deform the supporting side walls of the V-shaped grooves. This deformation in the side walls of the V-grooves may prevent the connectors from moving freely along the respective longitudinal axes of the V-grooves, thereby defeating a primary objective of the kinematic mount to accurately realign the first and second plates on reassembly.

Figure 6A:
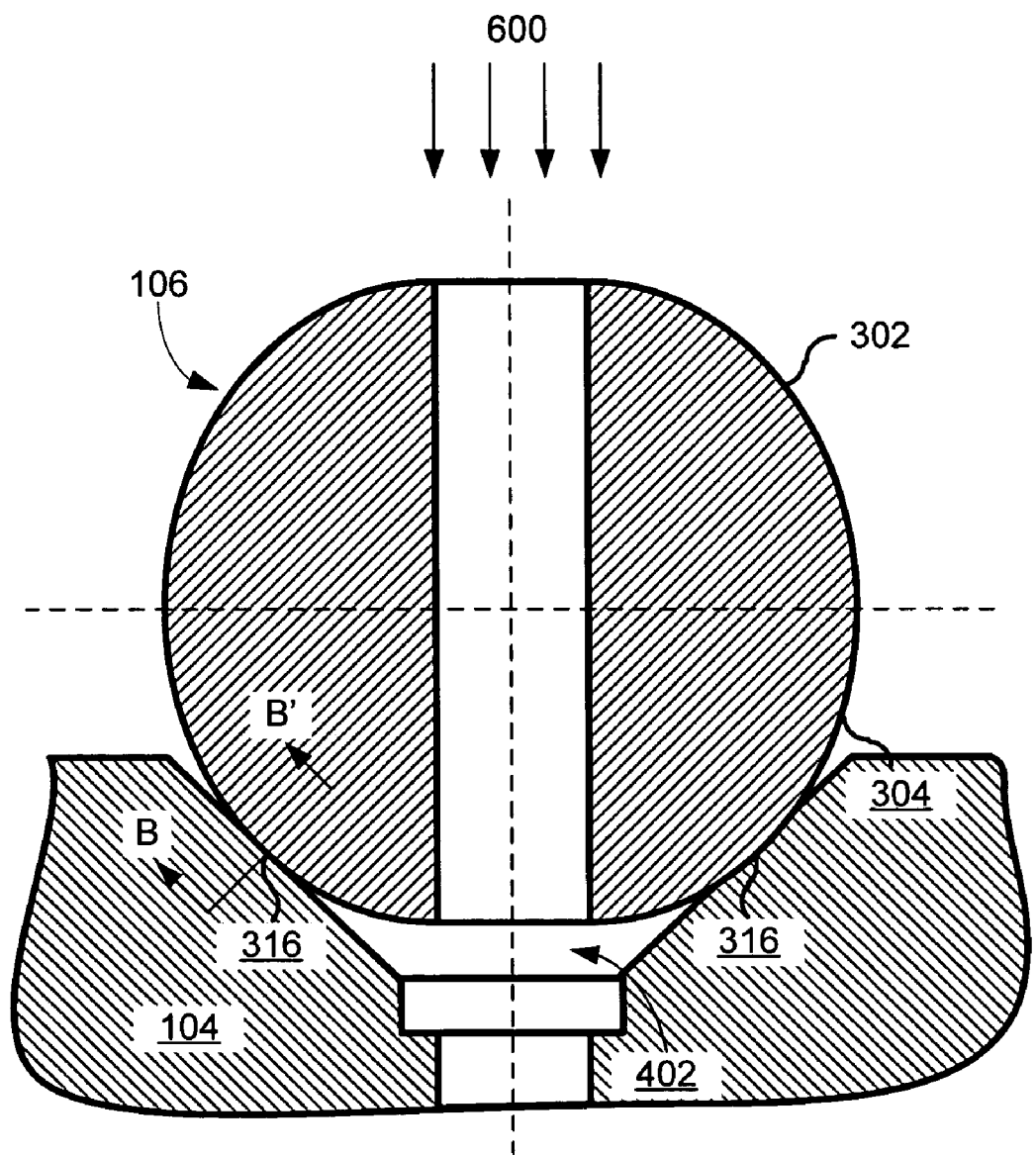
FIG. 6A is a cross-sectional view of a connector contacting a V-shaped groove as taken along line A–A' of FIG. 3B and a portion of the first plate including the V-shaped groove as taken along line 4B–4B' of FIG. 4A, according to some embodiments of the invention.

FIG. 6A is a partial cross-sectional view of the connector 106 contacting the V-shaped groove 402 as taken along line 3A–3A' of FIG. 3B and a portion of the first plate 104 including the V-shaped groove 402 as taken along line 4B–4B' of FIG. 4A, according to some embodiments of the invention. The connector 106 includes an at least partial spherical surface 302 and an at least partial cylindrical surface 304 opposing the at least partial spherical surface 302. As shown, the connector 106 contacts the V-shaped groove 402 in the second plate 104 at two contact lines 316 formed between the cylindrical surface 304 and the side walls of the groove 402. During assembly, to ensure accurate realignment, it is desirable that the connector 106 be able to move slightly along the longitudinal axis (into and out of the page) of the V-groove 402 in response to the application of a load 600 applied to the connector 106 from the second plate. However, as shown and described below in relation to FIG. 6B, such a load 600 may cause the connector 106 to deform the walls of the V-groove 402 along the contact lines 316, which may prevent the connector 106 from moving freely along the longitudinal axis.

Figure 6B:
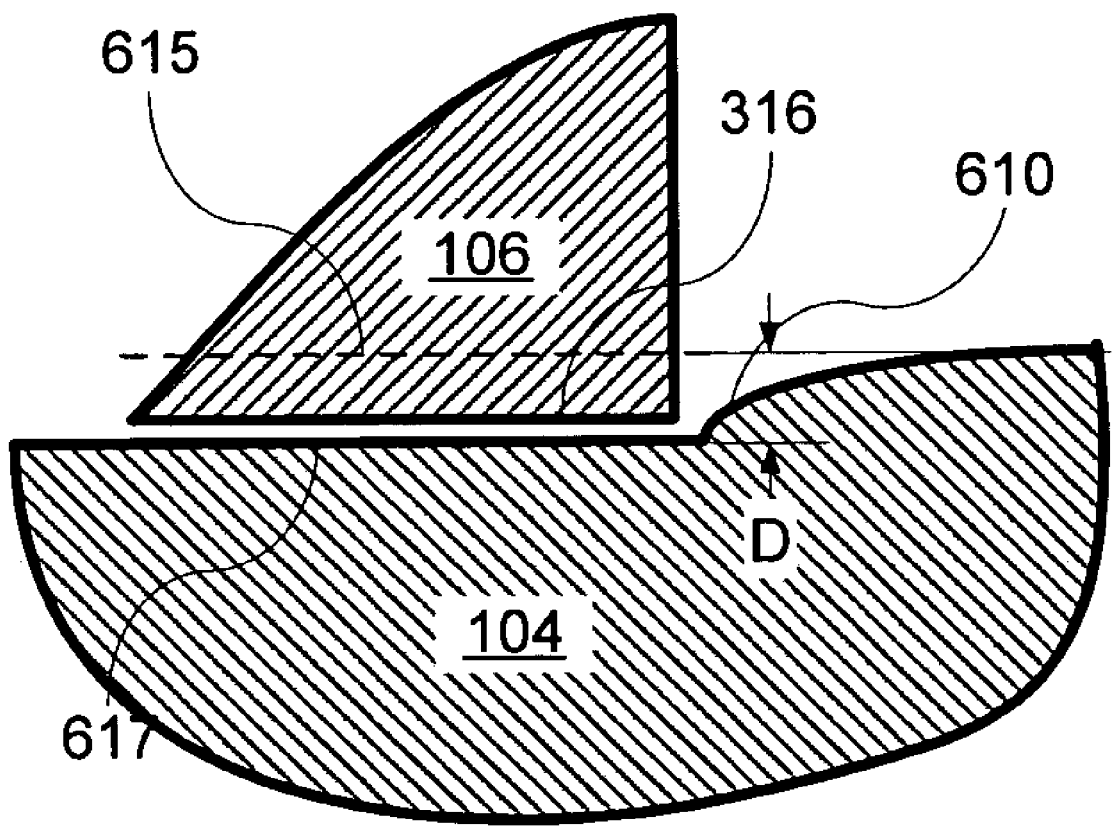
FIG. 6B is a cross-sectional view of a portion of the interface between the connector and the groove, as viewed along line B–B' of FIG. 6A, where the first embodiment of the connector has perpendicular edges between the cylindrical surface and the ends of the first embodiment of the connector.

FIG. 6B is a partial cross-sectional view of a portion of the interface between the connector 106 and the groove 402, as viewed along line B–B' of FIG. 6A. The connector and groove form a substantially perpendicular corner between the cylindrical surface 304 (FIG. 3A) and the ends 602 (only one of which is shown) of the connector 106. When loaded, a portion of the wall of the groove that contacts the connector 106 is deformed inward from its original position 608 to a new position 610. The portion of the wall of the groove that is not loaded by contact with the connector 106 remains at its original position 608. As a result, a depression 604 is formed in the wall of the groove, at least along the contact line 316. A lip 606 is formed at the edges of the depression 604 near the ends of the contact line 316.

In addition to the normal friction between the cylindrical surface of the connector and the walls of the groove along the contact line 316, the lip 606 creates an obstacle that prevents the connector 106 from moving along the longitudinal axis of the groove when the depression 604 is sufficiently deep. As a result, if the connector 106 cannot move freely along the contact line 316, the kinematic mount may not achieve accurate realignment when reassembled.

Figure 6C:
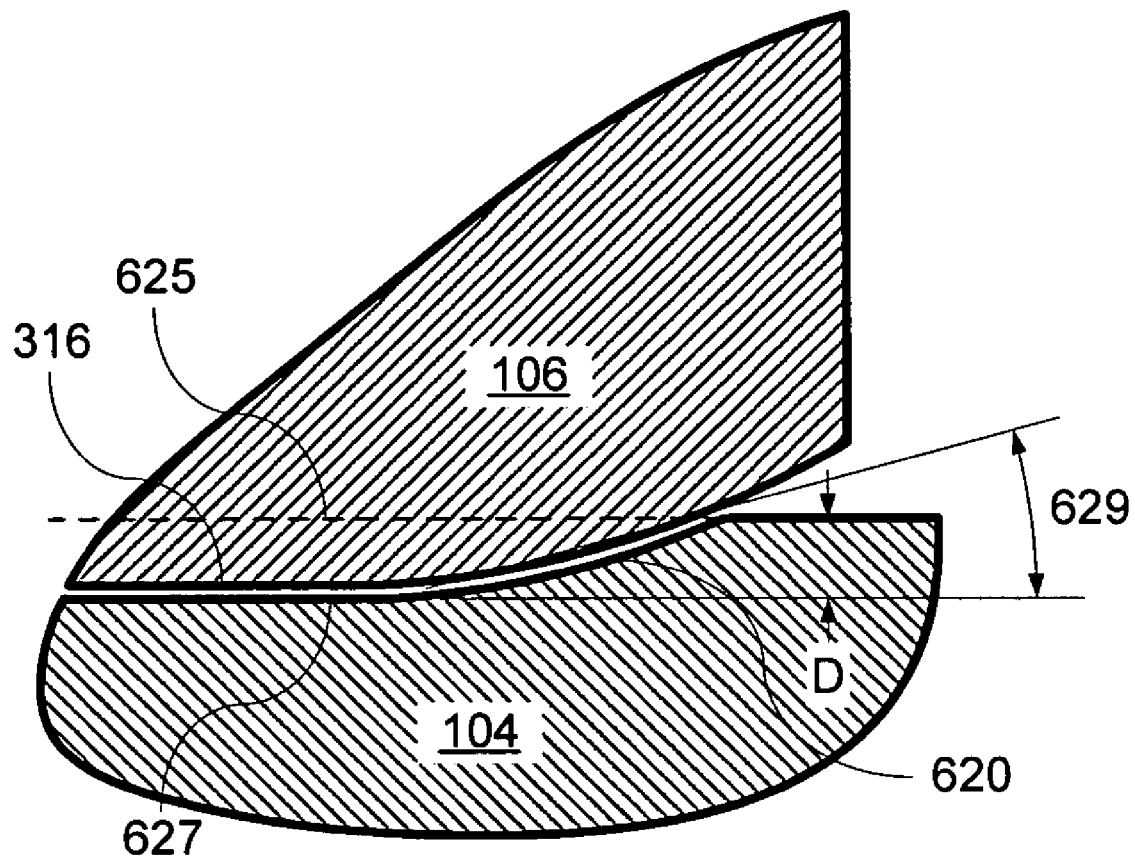
FIG. 6C is a cross-sectional view of a portion of the interface between another embodiment of a connector and the groove, as viewed along line B–B' of FIG. 6A, where the second embodiment of the connector has tapered edges between the cylindrical surface and the ends of the second embodiment of the connector.

FIG. 6C is a partial cross-sectional view of a portion of the interface between another embodiment of a connector 106A and a wall of a groove, as viewed along line B–B' of FIG. 6A. In this embodiment, the connector 106A has a tapered, filleted or beveled corner 628 between the cylindrical surface 304 (FIG. 3A) and the ends 620 of the connector 106A. In other words, the cylindrical surface 304 (FIG. 3A) of the connector 106A has a curved contour near the ends 620 of the connector. In some embodiments, the beveled corners 628 are formed at least at the ends of each of the contact lines 316 (FIG. 6A) of each of the connectors. Also in some embodiments, along each contact line 316, each beveled corner 628 is tangential to the substantially straight portion of the contact line 316, i.e., a small angle 629 is formed between the beveled corner 628 and the straight portion of the contact line 316.

As with the embodiment shown in FIG. 6B, when loaded, a portion of the wall of the groove that contacts the connector 106A is deformed inward from its original position or height 624 to a new position or height 626, thereby forming a depression 622 in the wall of the groove along the contact line 316. The portion of the wall of the groove that does not contact the connector 106A remains at its original position or height 624.

However, unlike the embodiment shown in FIG. 6B, the beveled corners 628 of the connector 106A form a shallow slope 630 at the edges of the depression 622. This shallow slope 630 substantially eliminates the formation of a lip 606 (FIG. 6B) and alleviates the connector sticking in the depression and being unable to move in the longitudinal direction of the groove. In other words, the depression 622 caused by surface deformation of the wall of the groove along the contact line 316 has a shallow slope 630 that allows the connector to move along the longitudinal axis of the connector without being lodged or stuck in the depression.

In some embodiments, the end of each contact line 316 has a smooth contour that is tangential to the remainder of the cylindrical surface 304 (FIG. 3A) and reduces the cylindrical radius by only about 0.1 mm at each end 620.

It will be apparent to one skilled in the art that the surface deformation shown in FIGS. 6B and 6C is exaggerated to highlight the invention. It will also be understood by one skilled in the art that the smooth contour or beveled corner near the ends of the contact lines of the cylindrical surface may have a different shape to that described above, so long as the connector is prevented from being lodged or stuck in the depression 622, as shown in FIG. 6B.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, the first surface and second surface may take on any suitable shape, as long as each surface defines the contact lines, as described above. Also, the various components described above are preferably made of a hard material, such as stainless steel. Alternatively, any suitable material may be used. The embodiments were chosen and described above in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents. In addition, any references cited above are incorporated herein by reference.

What is claimed is:

1. A kinematic mount for repeatedly coupling two components together, said kinematic mount comprising at least one connector, said at least one connector comprising:
   a first surface configured to contact a first component along two substantially parallel contact lines each having opposing ends, where said first surface is formed such that each of said two contact lines is curved near its opposing ends; and
   a second surface coupled to said first surface, wherein said second surface is configured to contact a second component along an annular contact line.

2. The kinematic mount of claim 1, wherein each contact line has curved portions near each of said opposing ends and a straight portion between said curved portions, where said curved portions are tangent to the straight portion.

3. The kinematic mount of claim 1, wherein said second surface defines an at least partial spherical surface.

4. The kinematic mount of claim 3, wherein said at least partial spherical surface is an at least partial hemisphere.

5. The kinematic mount of claim 1, wherein said first surface defines an at least partial cylindrical surface.

6. The kinematic mount of claim 5, wherein said at least partial cylindrical surface defines an at least partial half-cylinder.

7. A kinematic mount comprising:
   a first plate having three grooves therein, where said grooves are spaced 120 degrees apart from one another;
   a second plate having three indentations therein, where each of said indentations is located at a respective apex of an equilateral triangle; and
   three connectors, each comprising:
      a first surface configured to contact a respective groove along two substantially parallel contact lines each having opposing ends, where said first surface is formed such that each of said two contact lines is curved near its opposing ends; and
      a second surface coupled to said first surface, wherein said second surface is configured to contact a respective indentation along an annular contact line.

8. The kinematic mount of claim 7, wherein said second surface defines an at least partial spherical surface.

9. The kinematic mount of claim 8, wherein said at least partial spherical surface is an at least partial hemisphere.

10. The kinematic mount of claim 7, wherein said first surface defines an at least partial cylindrical surface.

11. The kinematic mount of claim 10, wherein said at least partial cylindrical surface defines an at least partial half-cylinder.

12. A kinematic mount for repeatedly coupling two components together, said kinematic mount comprising at least one connector, said at least one connector comprising:
   an at least partial cylindrical surface configured to contact a first component along two substantially parallel contact lines each having opposing ends, where said at least partial cylindrical surface is formed such that each of said two contact lines is curved near its opposing ends; and
   an at least partial hemispherical surface coupled to said at least partial cylindrical surface, wherein said at least partial hemispherical surface is configured to contact a second component along an annular contact line.

13. The kinematic mount of claim 12, wherein each contact line has curved portions near each of said opposing ends and a straight portion between said curved portions, where said curved portions are tangent to the straight portion.

14. The kinematic mount of claim 12, wherein said second surface defines an at least partial spherical surface.

15. The kinematic mount of claim 13, wherein said at least partial spherical surface is an at least partial hemisphere.

16. The kinematic mount of claim 12, wherein said first surface defines an at least partial cylindrical surface.

17. The kinematic mount of claim 16, wherein said at least partial cylindrical surface defines an at least partial half-cylinder.

* * * * *

UNITED STATES PATENT AND TRADEMARK OFFICE
CERTIFICATE OF CORRECTION

PATENT NO. : 7,173,779 B2  Page 1 of 1
APPLICATION NO. : 11/110114
DATED : February 6, 2007
INVENTOR(S) : Shelef It is certified that error appears in the above-identified patent and that said Letters Patent is hereby corrected as shown below:

On the title page, item:
(73), line 1, "Gizmonies, Inc." replace with --Gizmonics, Inc.--

Signed and Sealed this

Third Day of July, 2007

JON W. DUDAS
*Director of the United States Patent and Trademark Office*